United States Patent
Xu et al.

(10) Patent No.: US 12,354,277 B2
(45) Date of Patent: Jul. 8, 2025

(54) GROUND SEGMENTATION THROUGH SUPER VOXEL

(71) Applicant: GM Cruise Holdings LLC, San Francisco, CA (US)

(72) Inventors: Zhanping Xu, Sunnyvale, CA (US); Kartheek Chandu, Dublin, CA (US); Glenn D. Sweeney, Sebastopol, CA (US); Robert Vets, Seattle, WA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 426 days.

(21) Appl. No.: 17/890,173

(22) Filed: Aug. 17, 2022

(65) Prior Publication Data

US 2024/0062383 A1 Feb. 22, 2024

(51) Int. Cl.
| | |
|---|---|
| G06K 9/00 | (2022.01) |
| A61K 35/12 | (2015.01) |
| G06T 7/136 | (2017.01) |
| G06T 7/20 | (2017.01) |
| G06V 10/44 | (2022.01) |

(52) U.S. Cl.
CPC ............ *G06T 7/136* (2017.01); *G06T 7/20* (2013.01); *G06V 10/44* (2022.01); *G06T 2207/30252* (2013.01); *G06V 2201/07* (2022.01)

(58) Field of Classification Search
CPC ........... G06K 9/00; G06T 7/136; A61K 35/12
USPC ....... 382/100, 103, 106–107, 120, 154, 156, 382/168, 173, 180, 199, 206, 224, 254, 382/273, 276, 286–291, 305, 312; 348/47, 49, 73
See application file for complete search history.

(56) References Cited

U.S. PATENT DOCUMENTS

| | | | |
|---|---|---|---|
| 9,097,804 B1* | 8/2015 | Silver | B60W 40/076 |
| 2020/0132818 A1* | 4/2020 | Dussan | G01S 17/93 |
| 2020/0406904 A1* | 12/2020 | Yan | G07C 5/0841 |
| 2021/0051317 A1* | 2/2021 | Yan | G06T 7/80 |
| 2021/0323572 A1* | 10/2021 | He | G06T 3/14 |
| 2021/0374502 A1* | 12/2021 | Roth | G06N 3/08 |
| 2023/0048725 A1* | 2/2023 | Barbour | G06F 18/214 |
| 2023/0400584 A1* | 12/2023 | Dussan | G01S 7/4863 |

* cited by examiner

*Primary Examiner* — Seyed H Azarian
(74) *Attorney, Agent, or Firm* — CANTOR COLBURN LLP

(57) ABSTRACT

Aspects of the subject technology relate to systems, methods, and computer-readable media for performing ground segmentation through formation of a single super voxel. Image data tracking a surface as an object moves relative to the surface is accessed. Samples of the image data is grouped into different subsets to form a plurality of subsets of the image data. A normal vector to a corresponding plane defined by each subset of the plurality of subsets of the image data are identified. The samples of the image data are re-grouped into a single subset of the image data based on the corresponding normal vector for each subset of the plurality of subsets of the image data. A surface plane representation of the surface is identified based on the single subset of the image data.

17 Claims, 11 Drawing Sheets

GROUND SEGMENTATION THROUGH SUPER VOXEL

BACKGROUND

1. Technical Field

The present disclosure generally relates to ground segmentation and, more specifically, to ground segmentation through formation of a single super voxel.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

In controlling an autonomous vehicle, data gathered by sensors can be used to determine, or otherwise estimate, a ground plane for a ground surface that the vehicle is traversing. In turn, the identified ground plane can be used to control operation of the vehicle as it traverses the ground surface. In estimating the ground plane, data representing the ground in captured image data is segmented and then used to estimate the ground plane. Processes for segmenting captured image data are subject to error and can ultimately lead to incorrect estimation of the ground plane. In turn, this can lead to problems in accurately controlling the autonomous vehicle.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

As discussed previously, data gathered by sensors associated with an autonomous vehicle can be used to determine, or otherwise estimate, a ground plane for a ground surface that the vehicle is traversing. In turn, the identified ground plane can be used to control operation of the vehicle as it traverses the ground surface. In estimating the ground plane, data representing the ground in captured image data is segmented and then used to estimate the ground plane. Processes for segmenting captured image data are subject to error and can ultimately lead to incorrect estimation of the ground plane. In turn, this can lead to problems in accurately controlling the autonomous vehicle.

The disclosed technology addresses the problems associated with ground segmentation by grouping subsets of image data that tracks the ground and analyzing the subsets of image data to determine which subsets to include in a super voxel, otherwise referred to as a single subset of image data. In turn, the super voxel can be formed and processed to estimate the ground plane of the ground.

Figure 1:
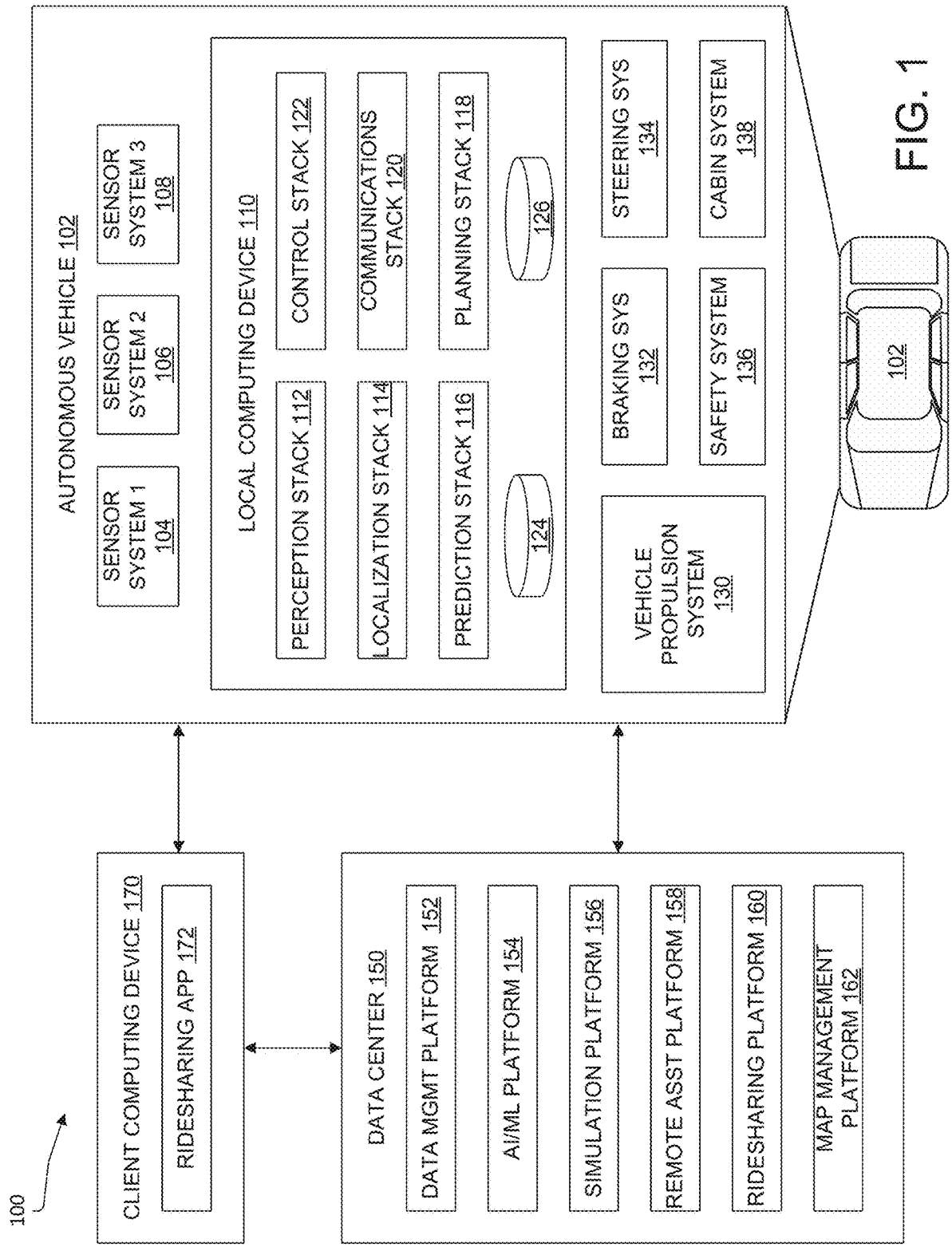
FIG. 1 illustrates an example system environment that can be used to facilitate autonomous vehicle (AV) dispatch and operations, according to some examples of the present disclosure.

FIG. 1 is a diagram illustrating an example autonomous vehicle (AV) environment 100, according to some examples of the present disclosure. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170.

These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some embodiments, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit en route to a pick-up or drop-off location, and so on.

While the autonomous vehicle 102, the local computing device 110, and the autonomous vehicle environment 100 are shown to include certain systems and components, one of ordinary skill will appreciate that the autonomous vehicle 102, the local computing device 110, and/or the autonomous vehicle environment 100 can include more or fewer systems and/or components than those shown in FIG. 1. For example, the autonomous vehicle 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 13.

Figure 2:
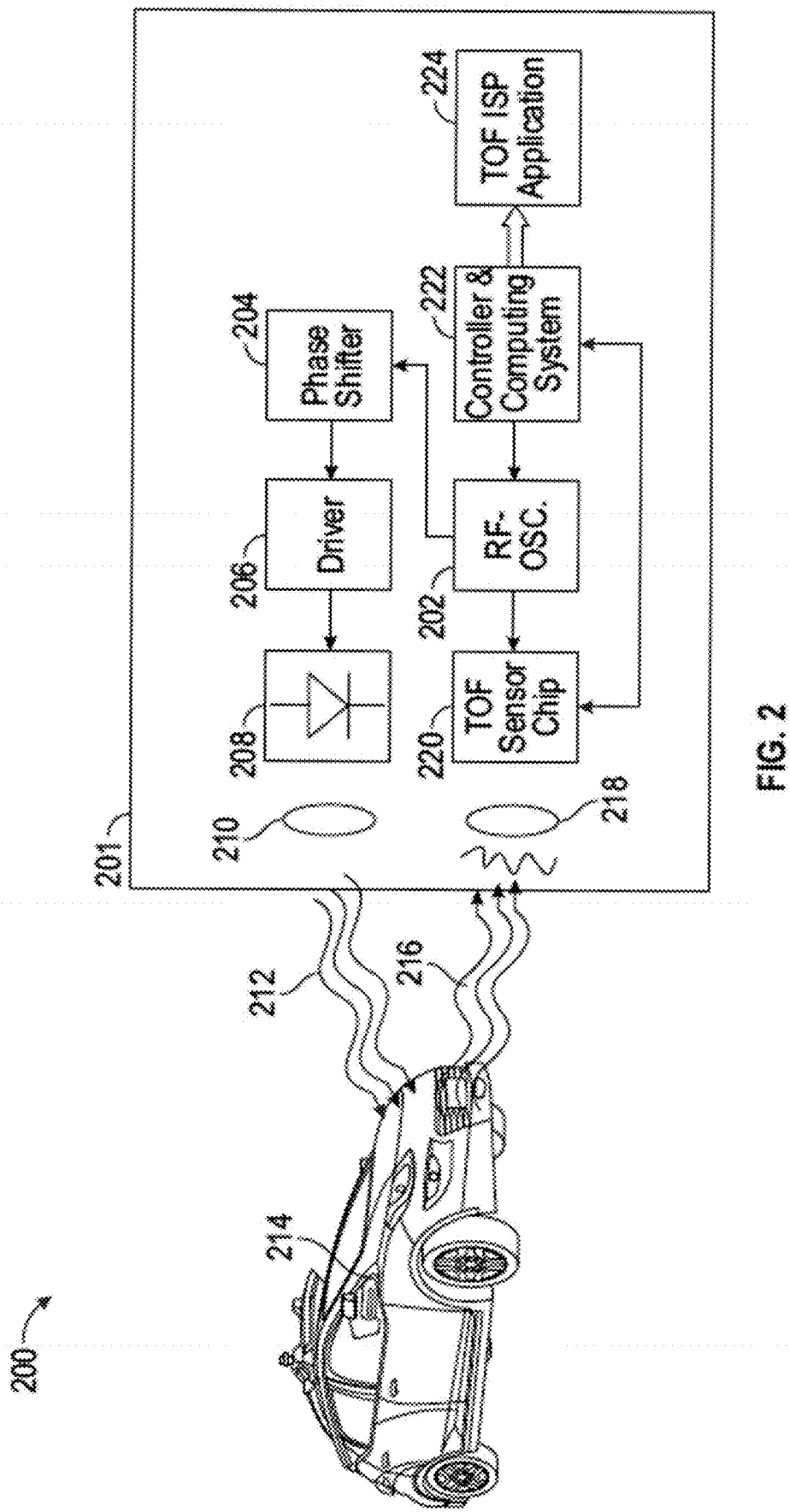
FIG. 2 illustrates an example imaging environment with a 3D camera system, according to some examples of the present disclosure.

FIG. 2 illustrates an example imaging environment 200 with a 3D camera system 201. The 3D camera system 201 can be used in implementing the technology described herein. Specifically, the 3D camera system 201 can be used to gather image data of a tracked surface. As follows, image data gathered by the 3D camera system 201 can be used in segmenting the tracked surface. Further, image data gathered by the 3D camera system 201 can be used in identifying one or a combination of a roll, a pitch, and an azimuth associated with an object as it moves along a tracked surface.

The 3D camera system 201 includes a local oscillator clock 202, a phase shifter 204 at the transmission channel, a driver 206, a light source 208, and a transmit optical element 210. The local oscillator clock 202 can be an applicable type of oscillator clock, otherwise referred to as an RF-oscillator clock. The local oscillator clock 202 can generate a clock signal that is ultimately used in modulating an output signal of the 3D camera system 201. The phase shifter 204 can receive the clock signal generated by the local oscillator clock 202 and delay it for purposes of creating a phase adjusted input. The driver 206 can receive the phase adjusted clock signal from the phase shifter 204 and modulate the light source 208 based on the phase adjusted clock signal to generate modulated output from the light source 208. The modulated output/light 212 can then pass through the transmit optical element 210 and be transmitted towards a target object 214.

While the 3D camera system 201 is described as operating with IR invisible electromagnetic radiation as the type of electromagnetic radiation used in imaging, the 3D camera system 201 can be implemented to use an applicable type of electromagnetic radiation for imaging. For example, the 3D camera system 201 can be implemented to use radio waves for imaging and potentially be incorporated with other types of sensors.

Further, while the target object 214 is shown as a car in the example imaging environment 200 shown in FIG. 2. This is for illustrative purposes, however, and the 3D camera system 201 can function to image one or more appropriate targets. Specifically, the 3D camera system 201 can be used in imaging or otherwise tracking a surface and regions surrounding the surface as an object traverses the surface. For example, the 3D camera system 201 can be used in imaging ground as an autonomous vehicle traverses the ground.

The 3D camera system 201 also includes a receive optical element 218, a TOF sensor 220, and a computer system 222 supporting an application 224. In the example environment 200, the modulated light 212 can include an RF modulated IR optical signal with an equal wave front. When the modulated light 212 interacts with the target object 214 some of the modulated light 212 is reflected back towards the 3D camera system 201 as a backscattered signal 216. The backscattered signal 216 includes the RF modulated IR optical signal backscattered with different time of flight (herein "TOF") delays. The different TOF delays in the backscattered signal 216 can represent, or otherwise encode, 3D information of the target object 214. 3D information of a target, as used herein, can include applicable information defining characteristics of a target in a 3D space. For example, 3D information of a target can include range information that describes a distance between a reference and a portion of the target. The backscattered signal 216 can pass through the receiving optical element 218 to a TOF sensor 220. The TOF sensor 220 can detect varying TOF delays in the backscattered signal 216. As follows, the TOF sensor 220 can communicate with the computer system 222 to process the TOF delays and generate 3D information based on the TOF delays. The computer system 222 can support an application 224 that performs further signal processing and controls various functional aspects, e.g. based on the 3D information. For example, the application 224 can control or facilitate control of an AV based on the 3D information.

While the phase shifter 204 is shown as being implemented on the transmitting channel, in various embodiments, the phase shifter 204 can be implemented in the receiving channel of the 3D camera system 201. Specifically, the phase shifter 304 can be implemented in the receiving channel to affect modulation of the signal generated by the light source 208. For example, the phase shifter 204 can be implemented between the TOF sensor 220 and the local oscillator 202.

Figure 3:
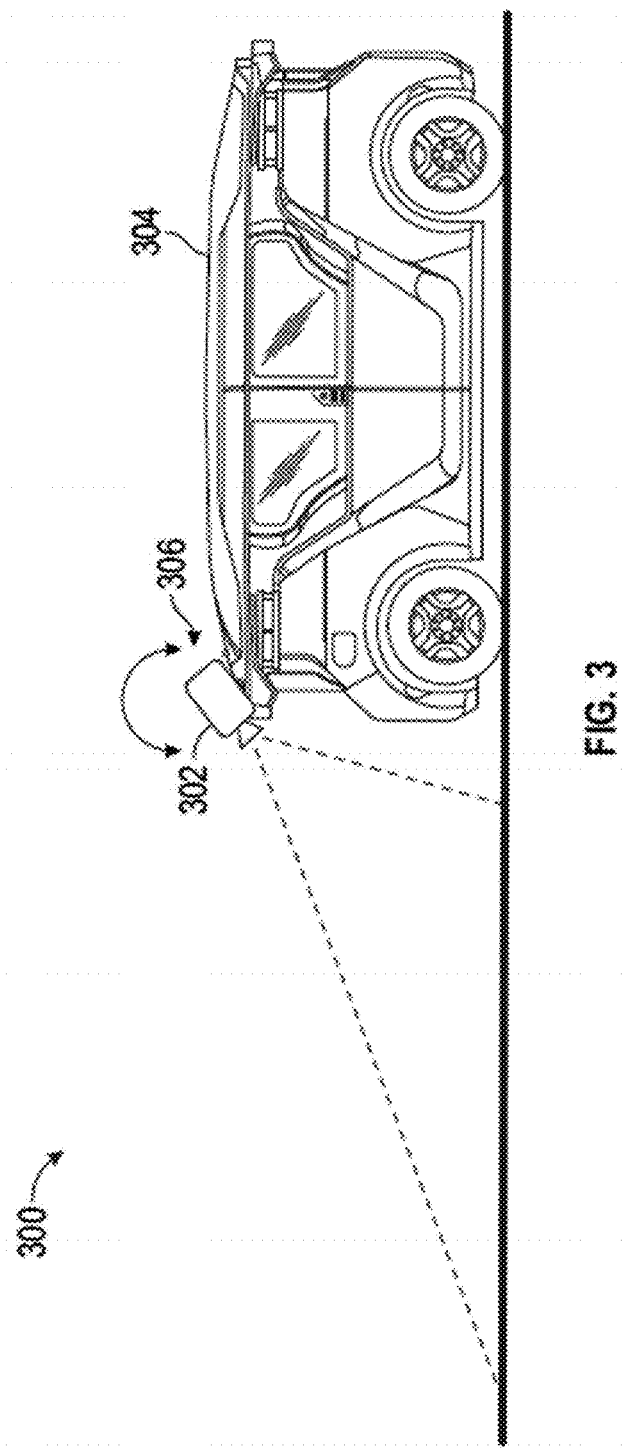
FIG. 3 illustrates a mounting arrangement for a camera and an autonomous vehicle, according to some examples of the present disclosure.

FIG. 3 illustrates an example mounting arrangement 300 for a camera 302 and an autonomous vehicle 304. The camera 302 can be an applicable camera for tracking a surface, such as the 3D camera system 201. Further, the mounting arrangement 300 can be implemented for performing the technology described herein. Specifically, the mounting arrangement 300 can be used in capturing image data for performing surface/ground segmentation with a super voxel. Additionally, the mounting arrangement 300 or multiples arrangement of 300 can be mounted in any suitable places on the AV and used in identifying one or a combination of roll, pitch, and azimuth of an object as it traverses a surface based on normal vectors for the surface.

The camera 302 can be mounted to the vehicle 304 through a mounting 306 that allows for the movement of the camera independent from movement of the vehicle 304. Specifically, the camera 302 can be mounted in a manner that facilitates adjustment of the pitch of the camera 302 with respect to the vehicle. In turn, the pitch of the camera 302 can be adjusted for different applications. Specifically, the pitch of the camera 302 can be adjusted to gather different types of test data for AVs.

The mounting 306 can facilitate movement of the camera 302 such that that car 304 remains out of the captured field of view (herein "FOV") of the camera 302. Specifically, the mounting 306 can be controlled to ensure that the car 304 remains out of the FOV of the camera 302. For example, the pitch of the camera 302 can be controlled to keep the car 304 out of the FOV of the camera 302. The mounting 306 can be controlled based on data gathered by the camera 302 to ensure that the car 304 remains out of the FOV of the camera 302. For example, grayscale image data captured by the camera 302 can be monitored to determine whether the car 304 is in the FOV of the camera 302. In turn, if it is determined that the car 304 is in the FOV of the camera 302 from the grayscale image data, then the mounting 306 can be operated to move the car 304 out of the FOV of the camera 302.

Figure 4:
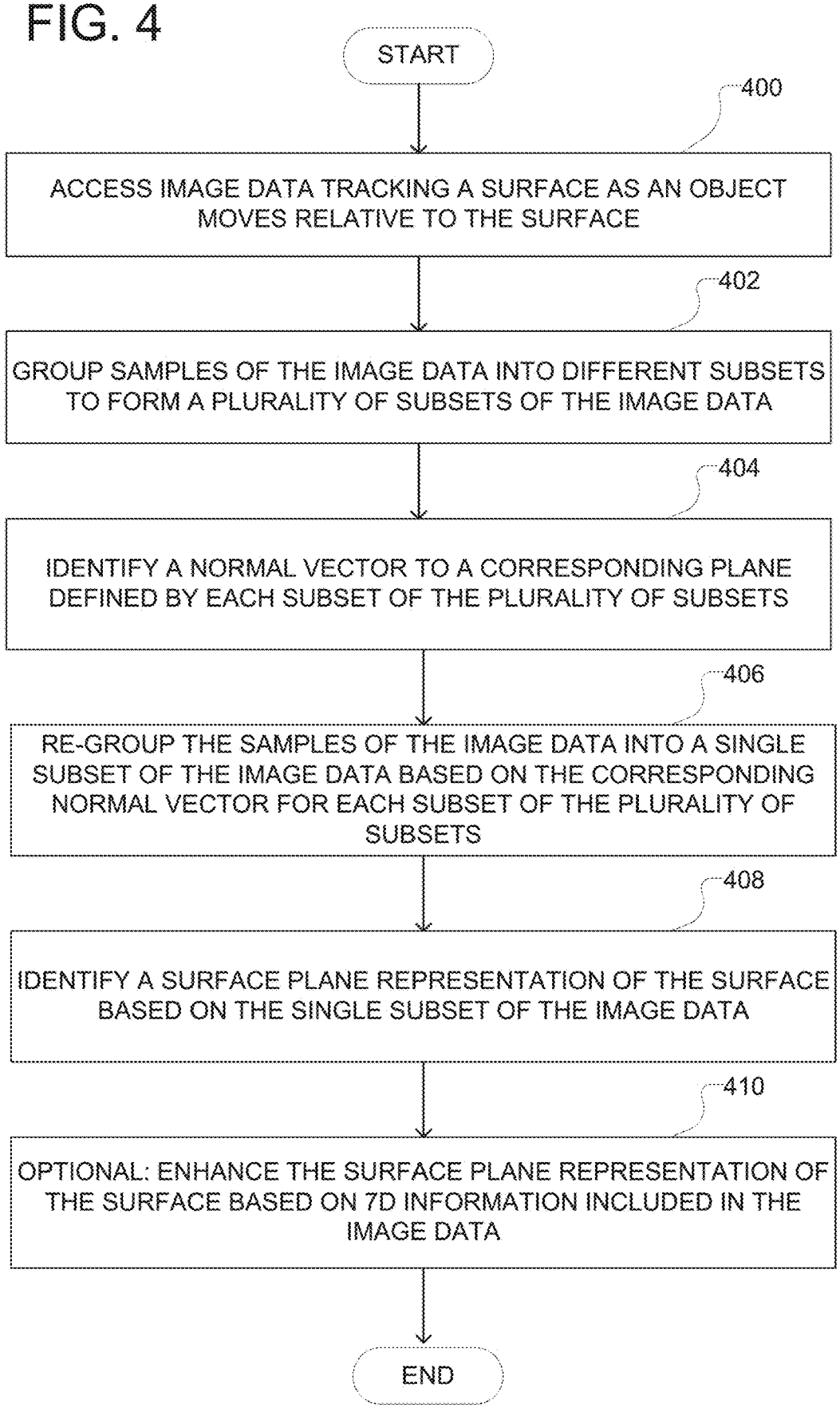
FIG. 4 illustrates a flowchart for an example method of identifying a surface plane representation of a surface using a super voxel, according to some examples of the present disclosure.

The disclosure now continues with a discussion of techniques for overcoming the previously described deficiencies in segmenting a surface from captured image data. Specifically, FIG. 4 illustrates a flowchart for an example method of identifying a surface plane representation of a surface using a super voxel. The method shown in FIG. 4 is provided by way of example, as there are a variety of ways to carry out the method. Additionally, while the example method is illustrated with a particular order of steps, those of ordinary skill in the art will appreciate that FIG. 4 and the modules shown therein can be executed in any order and can include fewer or more modules than illustrated. Each module shown in FIG. 4 represents one or more steps, processes, methods or routines in the method.

At step 400, image data is accessed that tracks a surface of an object as the object moves relative to a surface. The image data can be captured by an applicable camera for capturing image data/tracking a surface. Specifically, the image data can be captured by an applicable range camera, such as the 3D camera system 201. The image data can also include captured data of the surface when the object remains stationary on the surface. For example, the image data can include data of a surface before the object starts moving on the surface.

An object that moves along a surface, as discussed with respect to the technology described herein, can include an applicable device whose movements can be controlled as the object is moved along the surface. Specifically, an object can include a device whose movements can be autonomously controlled as it moves along the surface. For example, an object can include an autonomous vehicle or a robot.

Figure 5:
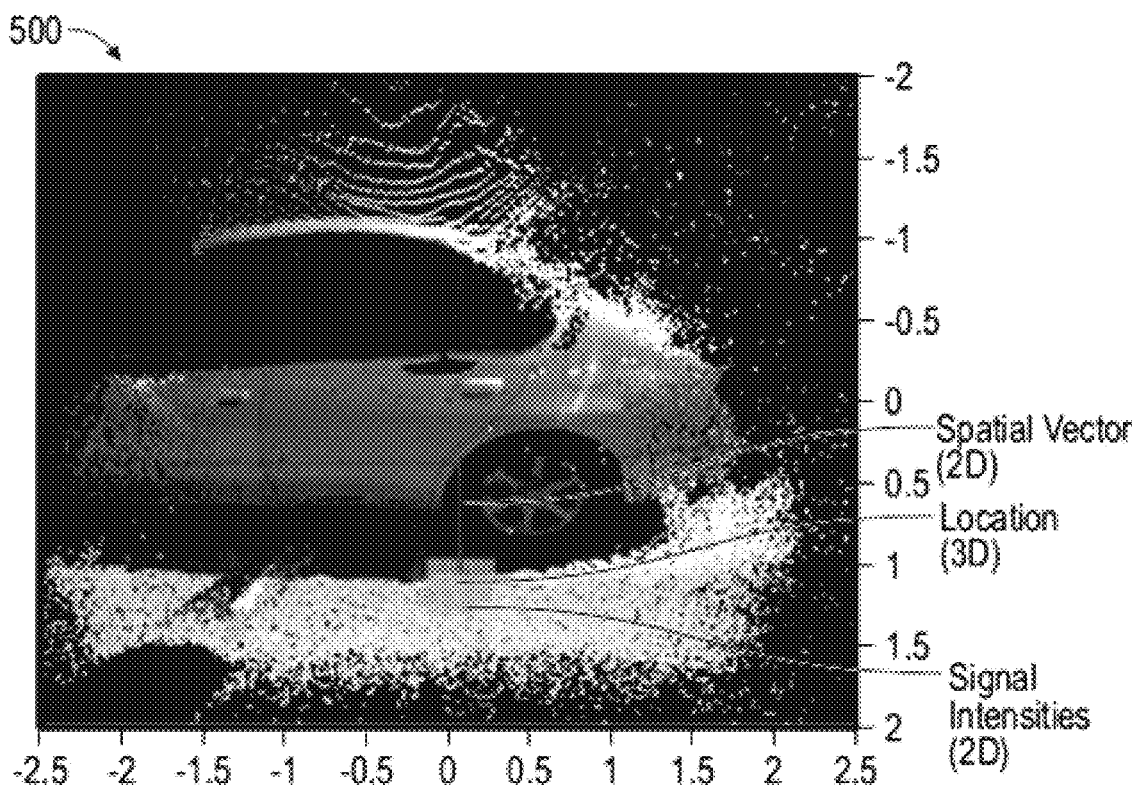
FIG. 5 illustrates a captured frame with 7D image data, according to some examples of the present disclosure.

The image data can include applicable data gathered by a camera for identifying a surface plane representation of a surface from the data based on a super voxel. In particular, the image data can include applicable data gathered as a point cloud, e.g. from a range camera. For example, the image data can include 3D spatial location data. Additionally, the image data can include 7D data. FIG. 5 illustrates a captured frame 500 with 7D image data. Specifically, the frame 500 includes 3D spatial location data, 2D spatial orientation angles of azimuth and elevation determined by the normal vector of the subset, and 2D active that can be enhanced by the 2D passive signal intensity data. The 2D spatial orientation angles of azimuth and elevation are shown as a 2D spatial vector in the frame 500.

Returning back to the flowchart shown in FIG. 4, at step 402, samples of the image data are grouped into different subsets to form a plurality of subsets of the image data. Samples, as used herein, can include voxels, pixels, or other applicable units that divide the image data. Further, while reference is made to voxels and super voxels throughout this discussion, the technology, in various aspects, can be applied on a pixel basis, a sample basis, and other applicable unit of the image data basis. Super, as used herein, refers to a resultant grouping of multiple samples into a single group featuring the same or similar information for the perception applications. In grouping the samples of image data into different subsets, the samples can be grouped uniquely into specific subsets such that samples are not shared between different subsets. For example, pixels can be grouped together into a unique subset and the pixels are not shared with or otherwise grouped into other subsets.

The samples of image data can be grouped across a unique sample type or data type which can then be used in grouping other types of data included in the image data. Specifically, depth pixels in the image data can be grouped together to define a subset of the image data, e.g. a kernel. As follows, the image data corresponding to the depth pixels, e.g. other 7D information of the image data, can be included in the subset to further define a super voxel. For example, the 2D image data, for passive 3D cameras such as stereo 3D cameras and active light images for active illumination 3D cameras such as 3D TOF cameras, can be included with the corresponding depth pixels in the subset to define a super voxel.

An applicable technique for grouping samples of image data together as part of plane segmentation can be applied in initially grouping the samples at step 402. Specifically, the samples can be grouped based on defined or otherwise determined specifications. For example, pixels in the image data can be grouped into 30 by 30 groups of pixels. Further, the samples can be grouped based on similarities in characteristics between the samples. For example, pixels having the same intensity can be grouped together to form a subset of pixels.

Figure 6:
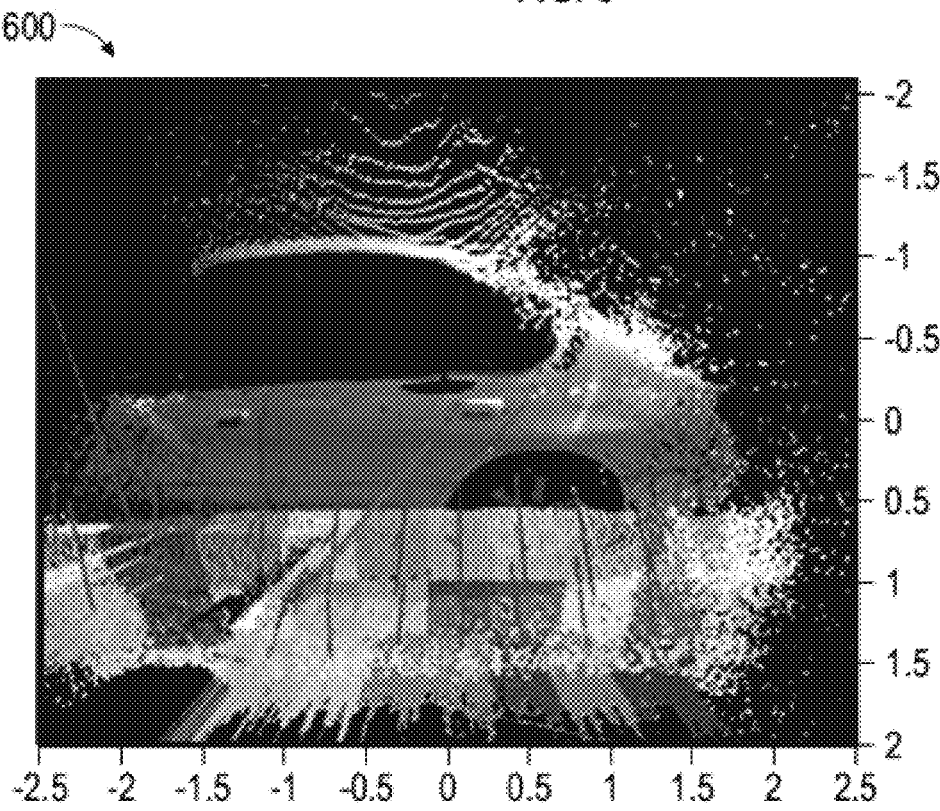
FIG. 6 illustrates a captured frame with image data that has been grouped into different super voxels, according to some examples of the present disclosure.

At step 404, a normal vector to a corresponding plane defined by each subset of the plurality of subsets is identified. Specifically, a plane that estimates the surface defined by the image data included in each subset of samples can be identified. In turn, a normal to the plane, otherwise referred to as a normal vector or surface normal, is determined for each subset of samples. For example, normal vectors can be defined for the super voxels that are formed by grouping the samples into the different subsets of samples at step 402. FIG. 6 illustrates a captured frame 600 with image data that has been grouped into different super voxels. Specifically, the different super voxels are represented as different textures in the foreground and under the vehicle in the captured frame 600. The frame 600 also shows the corresponding normal vectors for each super voxel, e.g. as is determined at step 404. As shown in FIG. 6, characteristics of the normal vectors differ across the super voxels.

Returning back to the flowchart shown in FIG. 4, at step 408, the samples of the image data are regrouped into a single subset of the image data based on the corresponding normal vector for each subset of the plurality of subsets. Specifically, certain super voxels can be discarded and other super voxels can be included to form a single super voxel, e.g. single subset of the image data. As a result, the single subset of image data can include less samples of image data than the total number of samples that are included in the image data. Specifically, the resultant single super voxel can include less samples of image data than the total image data that was initially grouped into the different subsets to form the different super voxels at step 402.

In regrouping the samples of the image data into a single subset based on the corresponding normal vector for each subset of image data, subsets of image data can be discarded, otherwise excluded from the single subset, based on characteristics of the corresponding normal vector. Characteristics of a normal vector can include applicable features of the normal vector that define the normal vector in an applicable domain associated with the image data. Specifically, characteristics of the normal vector can include spatial characteristics of the normal vector that define the normal vector in space. For example, characteristics of the normal vector can define angles of the normal vector with respect to a reference plane.

Subsets of the samples can be discarded by comparing corresponding normal vectors of the subsets to threshold values associated with the corresponding normal vectors. For example, the absolute differential value of the elevation angle between the normal vector of the subset and that of the reference plane can be used in discarding corresponding normal vectors. The threshold values can define characteristics of normal vectors which can ultimately be used to discard subsets of samples from the single subset of image data. For example, the threshold values can define spatial characteristics of normal vectors that should be met in order to include a subset of samples in the single subset of image data, e.g. single super voxel. Thresholds can be defined with respect to a reference normal vector that is defined within a domain represented by the image data.

Further, subsets of the samples can be discarded by comparing corresponding normal vectors across the different subsets of the samples. Specifically, normal vectors of the different super voxels can be compared to determine whether to discard the super voxels. In comparing different subsets of samples across the corresponding normal vectors, thresholds and references for determining whether to discard the subsets of samples can be determined based on the comparison. For example, the normal vectors of the super voxels can be compared to each other to determine a reference normal vector. Further, the comparison can be used to define thresholds with respect to the normal vector that should be met in keeping a super voxel.

Figure 7:
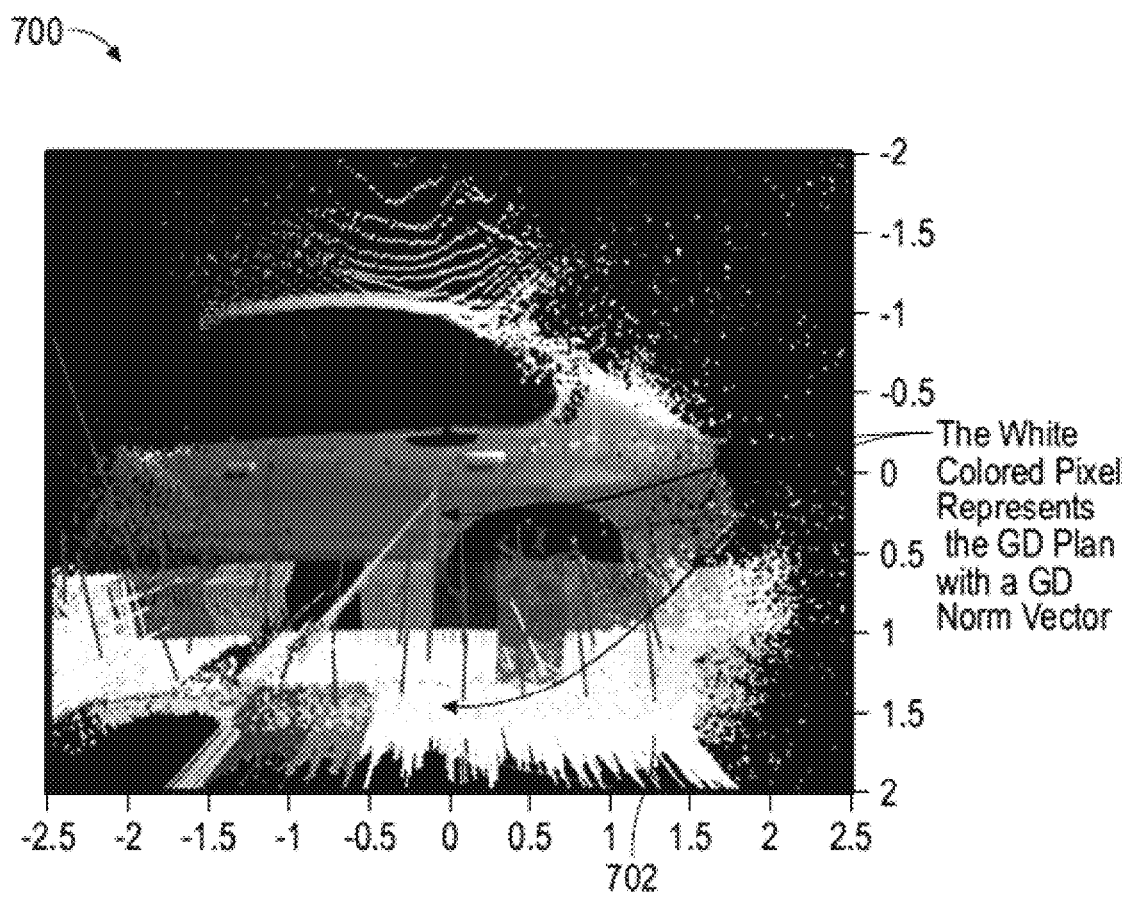
FIG. 7 illustrates a captured frame with image data that has been grouped into a single super voxel from different super voxels, according to some examples of the present disclosure.

FIG. 7 illustrates a captured frame 700 with image data that has been grouped into a single super voxel 702 from different super voxels. Specifically, the single super voxel 702 is shown as a different texture from textures of the other super voxels that were not included in forming the single super voxel 702.

Returning back to the flowchart shown in FIG. 4, at step 408, a surface plane representation of the surface is identified based on the single subset of the image data. Specifically, a plane can be estimated from the image data included in the single subset of image data, e.g. single super voxel, to represent the surface traversed by the object. More specifically, this plane can represent a ground truth of a ground plane/surface traversed by the object. For example, a near field ground plane can be determined based on the image data included in the single super voxel. This surface plane is shown as the same textured area representing the single super voxel 702 in FIG. 7. For the AV stability application (with pitch, roll, and azimuth detection) the single super voxel 702 can be used to find its ground norm vector with its components [Nx Ny, Nz] defined in FIG. 9. As will be discussed in greater detail later, this surface and corresponding normal vector can be used in determining one or a combination of roll, pitch, and azimuth of an object. For the ground segmentation applications, the single voxel 702 does not contain every near subset of the super voxels. Therefore, interpolation can cover the disqualified subsets for the ground vector. In one example, a plane can be composed with a ground norm vector [Nx Ny, Nz] that intersects with the 'central gravity' location [Xc Yc Zc] of the single super voxel 702. The 'central gravity' location can be identified according to Equations 1-3.

$$Xc = \Sigma_{i,j}(X(i,j))/N \qquad \text{Equation 1}$$

$$Yc = \Sigma_{i,j}(Y(i,j))/N \qquad \text{Equation 2}$$

$$Zc = \Sigma_{i,j}(Z(i,j))/N \qquad \text{Equation 3}$$

In corresponding Equations 1 through 3, X(i,j), Y(i,j), and Z(i,j) are the point cloud coordinates corresponding to each individual pixel within the boundary of the super pixel 702 with pixel index (i,j), N is the total number of the individual pixels of 702. Therefore, the fitted plane can be expressed according to Equation 4.

$$Nx^*(X(i,j)-Xc) + Ny^*(Y(i,j)-Yc) + Nz^*(Z(i,j)-Zc) = 0 \qquad \text{Equation 4}$$

X(i,j) and Y(i,j) can be determined from the point clouds and Z(i,j) can be determined by Equation 4 corresponding to the fitted plane. This plane can be used as a reference plane to perform ground segmentation. The distance of the point cloud close to the plane within a threshold can be characterized as the ground then.

At optional step 410, the surface plane representation of the surface is enhanced based on the 7D information included in the image data. In the daylight condition the street is illuminated by the solar light. The grays scale mean of each subset is with a similar value. Therefore, the outlined grayscale mean value can be further excluded. The shadow and street mark may affect some of the subset grayscale means that can be treated also as outliers. In the daylight and nightlight conditions the TOF signal amplitude mean of the image has a distribution map over the ground, the same in daylight, shadow, and nightlight conditions. This feature can be used as a reference image map. The distribution mainly is determined by the active light strength on the different locations and the street material. The TOF signal amplitude mean of the subset can be compared with the referenced distribution. It is favorable to have a normalized TOF signal amplitude mean of the subset image and the reference image map for the comparison. The environment light and the shadow will not affect the comparison results, but the street mark on the street does, which can be also treated as outlier.

Figure 8:
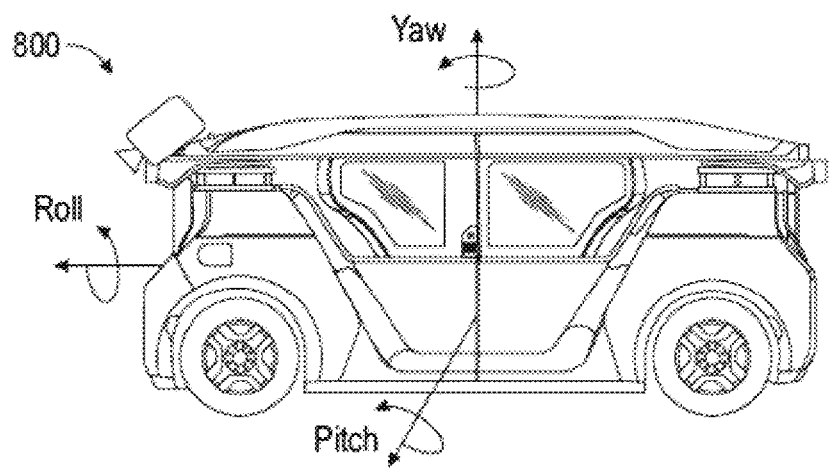
FIG. 8 illustrates an environment showing roll and pitch of a vehicle relative to a surface, according to some examples of the present disclosure.

The disclosure now continues with a discussion of determining one or a combination of roll, pitch, and azimuth of an object relative to a surface based on a normal vector to a surface. Specifically, FIG. 8 illustrates an environment 800 showing roll and pitch of a vehicle relative to a surface. Identifying roll and pitch relative to a surface is advantageous over current techniques for identifying roll and pitch because current techniques have difficulty accounting for hills, otherwise changes in elevation of the surface. For example, if a car drives up a hill, an inertial measurement unit can detect the movement of the car up the hill as changing roll and pitch. However, the actual roll and pitch of the car relative to the hill has not changed. Similarly, azimuth of an object relative to a surface can be determined through the technology described herein. This is advantageous as the azimuth of the object can be used in detecting whether all or a portion of the object has lost contact with the surface.

Figure 9:
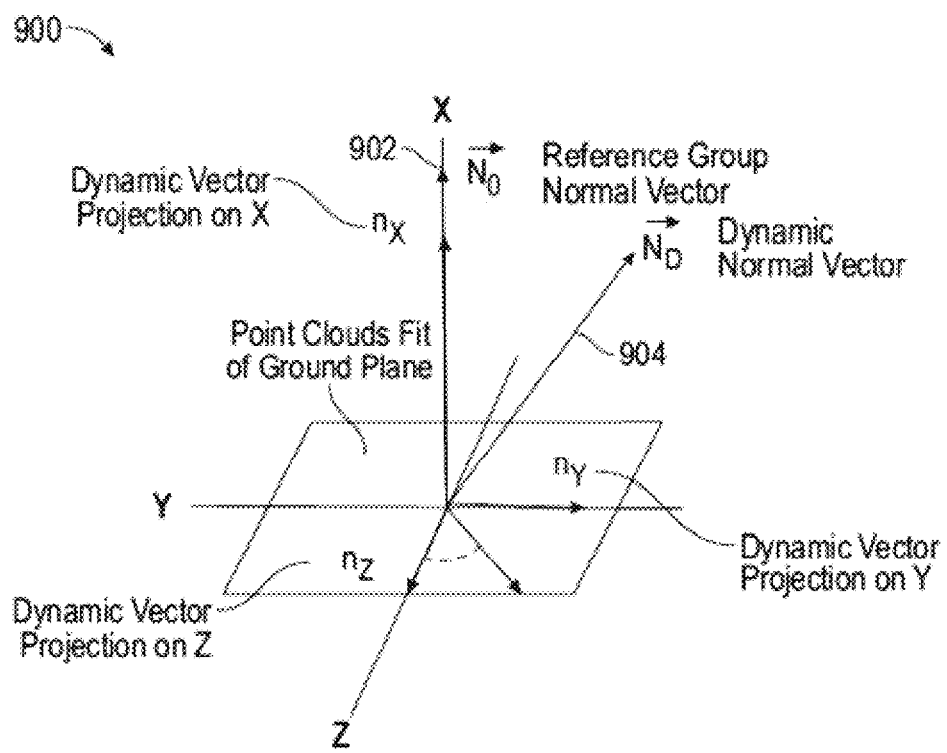
FIG. 9 is a 3D coordinate system illustrating various components for determining roll, pitch, and azimuth of an object relative to a surface based on a surface normal to the surface, according to some examples of the present disclosure.
Figure 10:
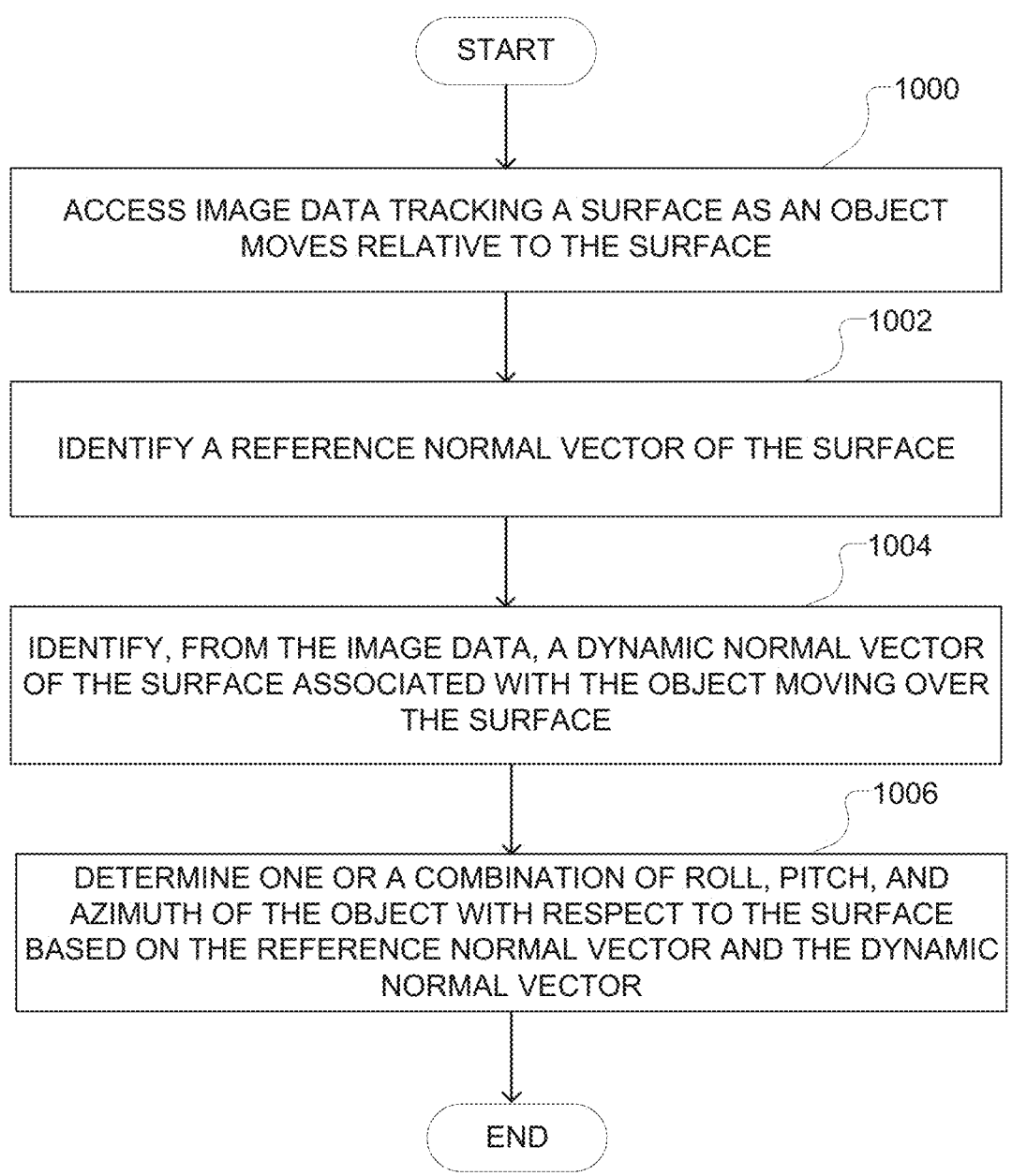
FIG. 10 illustrates a flowchart for an example method of determining roll, pitch, and azimuth of an object relative to a surface based on a surface normal to the surface, according to some examples of the present disclosure.

FIG. 9 is a 3D coordinate system 900 illustrating various components for determining roll, pitch, and azimuth of an object relative to a surface based on a surface normal to the surface. FIG. 10 illustrates a flowchart for an example method of determining roll, pitch, and azimuth of an object relative to a surface based on a surface normal to the surface. The method shown in FIG. 10 is provided by way of example, as there are a variety of ways to carry out the method. Additionally, while the example method is illustrated with a particular order of steps, those of ordinary skill in the art will appreciate that FIG. 10 and the modules shown therein can be executed in any order and can include fewer or more modules than illustrated. Each module shown in FIG. 10 represents one or more steps, processes, methods or routines in the method.

At step 1000, image data tracking a surface as an object moves relative to the surface is accessed. The image data can be gathered by an applicable camera or sensor. More specifically, the image data can be gathered by a sensor or camera affixed or otherwise coupled to the object as the object moves relative to the surface. For example, the image data can be captured by the 3D camera system 201 affixed to a car. The image data accessed at step 1000 can include image data that includes the surface while the object remains static relative to the surface. For example, the image data accessed at step 1000 can include image data of a road before a car starts moving on the road.

At step 1002, a reference normal vector of the surface is identified. The reference normal vector is shown in FIG. 9 as vector 902, represented by No. The reference normal vector is a normal vector to an estimation or representation of a surface that is used as a reference for ultimately determining roll, pitch, and azimuth of an object relative to the surface. Specifically, the reference normal vector is a normal vector to a surface plane that is estimated for a surface. A surface plane of the surface that is ultimately used to determine the reference normal vector identified at step 1002 can be determined through an applicable technique. Specifically, a surface plane of the surface can be identified using the super voxel techniques described herein, e.g. by the method shown in the flowchart in FIG. 4.

The reference normal vector can be determined from an applicable source of data. Specifically, the reference normal vector can be determined by empirical evidence associated with the surface, e.g. from the image data of the surface accessed at step 1000. As follows, the reference normal vector can be a ground truth normal vector of the surface. In determining the reference normal vector from the image data accessed at step 1000, the reference normal vector can be determined from image data that is gathered as the object remains static relative to the surface. Further, the reference normal vector can be determined from image data that is gathered as the object moves on the surface. For example, the reference normal vector can be dynamically determined from image data tracking the surface as the object moves relative to the surface during the secure and safe driving process. In a static test station, a static fidutlial near flat field can be used to acquire a reference normal vector and store it for the application. Further in the start and stop process, the reference normal vector can be modified due to aging or mislocation of the camera mount on the AV. In the secure and safe driving process, the ground reference normal vector can be dynamically updated due to the ground truth being slightly tilting (under a safety threshold value) with respect to the static reference plane. The application is with a 3D camera being thermal calibrated.

At step 1004, a dynamic normal vector of the surface that is associated with the object moving over the surface is identified. The dynamic normal vector is shown in FIG. 9 as vector 904, represented by $N_D$. Specifically, the dynamic normal vector is a normal vector of a surface that is identified from at least a portion of captured image data tracking the surface as the object moves relative to the surface. The dynamic normal vector can change relative to the reference ground normal vector based on the movement of the object over the surface. For example, as a car accelerates over ground, the dynamic normal vector can be tilted with respect to the reference ground normal vector to the ground, as is shown in FIG. 9.

The dynamic normal vector can be identified based on a surface plane that is estimated for the surface from image data as the object moves relative to the surface. A surface plane of the surface that is ultimately used to determine the dynamic normal vector identified at step 1004 can be determined through an applicable technique. Specifically, a surface plane of the surface can be identified using the super voxel techniques described herein, e.g. by the method shown in the flowchart in FIG. 4.

The dynamic normal vector can be variously updated over time as the object moves over the surface. Specifically, in identifying the dynamic normal vector from captured image data, the dynamic normal vector can be variously updated over time as the captured image data changes. More specifically, the dynamic normal vector can be variously updated over time as new image data is captured that tracks the surface as the object moves over the surface. Accordingly, one or a combination of roll, pitch, and azimuth for the object can be monitored continuously as the object moves over the surface. The dynamic normal vector can be identified from the image data in relation to the identification of the reference normal vector. For example, the dynamic normal vector can be identified from the image data after the reference normal vector is applied based on the stored or modified reference data.

At step 1006, one or a combination of roll, pitch, and azimuth of the object are determined with respect to the surface based on the reference normal vector and the reference dynamic normal vector. As discussed previously, determining roll, pitch, and azimuth of an object relative to a surface is advantageous to current techniques, such as through the use of inertial measurement units. For example, determining roll, pitch, and azimuth of the object relative to the surface can account for changes in absolute elevation of the surface in ultimately determining roll, pitch, and azimuth. In turn and depending on application, the object can be more precisely simulated and controlled, e.g. in the context of an AV.

In determining roll, pitch, and azimuth of the object relative to the surface based on the reference normal vector and the dynamic normal vector, coordinate axes for the surface are defined in a 3D space based on the reference normal vector, e.g. a surface plane representation that defines the reference normal vector. This is shown in FIG. 9, where the coordinate axes are defined relative to the reference ground normal vector 902. Specifically, in the 3D coordinate system 900 shown in FIG. 9, the X axis is mapped onto the reference ground normal vector 902. As follows, the Y axis and the Z axis can be defined with respect to the X axis, and the corresponding ground normal vector 902.

After the coordinate axes are defined based on the reference normal vector, the dynamic normal vector is projected onto the coordinate axes. For example and as shown in FIG. 9, $N_D$ is projected onto the X axis as $n_x$, onto the Y axis as $n_y$, and onto the Z axis as $n_z$. In turn, the projections of the dynamic normal vector onto the coordinate axes can be used to determine one or a combination of roll, pitch, and azimuth associated with the object. Specifically, a pitch angle of the object can be defined and determined based on Equation 5.

$$\phi_P = a\tantan\left(\frac{n_y}{n_x}\right) \quad \text{Equation 5}$$

In Equation 5, $n_y$ and $n_x$ are two of the corresponding projections of the dynamic normal vector on two of the coordinate axes. Further, a roll angle of the object can be determined based on Equation 6.

$$\phi_R = a\tantan\left(\frac{n_z}{n_x}\right) \quad \text{Equation 6}$$

In Equation 6, $n_z$ and $n_x$ are two of the corresponding projections of the dynamic normal vector on two of the coordinate axes. Additionally, an azimuth angle of the object can be determined based on Equation 7.

$$\phi_{AZ} = a\tan\tan\left(\frac{n_y}{n_z}\right) \qquad \text{Equation 7}$$

In Equation 7, $n_y$ and $n_z$ are two of the corresponding projections of the dynamic normal vector on two of the coordinate axes.

The resulting roll, pitch, and/or azimuth that is determined in the method represented by FIG. 10 can be used in controlling the object as it traverses the surface. Specifically, the roll, pitch, and/or azimuth can be used to determine whether the object has, at least in part, lost contact with the surface. In turn, this can be used to control operation of the object as it traverses the surface. For example, the roll, pitch, and/or azimuth determined for an AV as the AV traverses a road, as determined from the method represented in FIG. 10, can be used in controlling the AV as it traverses the road.

The roll, pitch, and azimuth can be determined for an object at a specific rate as the surface is tracked. Specifically, the image data can be gathered at a specific frame rate per second. In turn, the roll, pitch, and azimuth can be determined in relation to the frame rate per second. For example, the roll, pitch, and azimuth can be determined at a rate of ten times per second.

Figure 11:
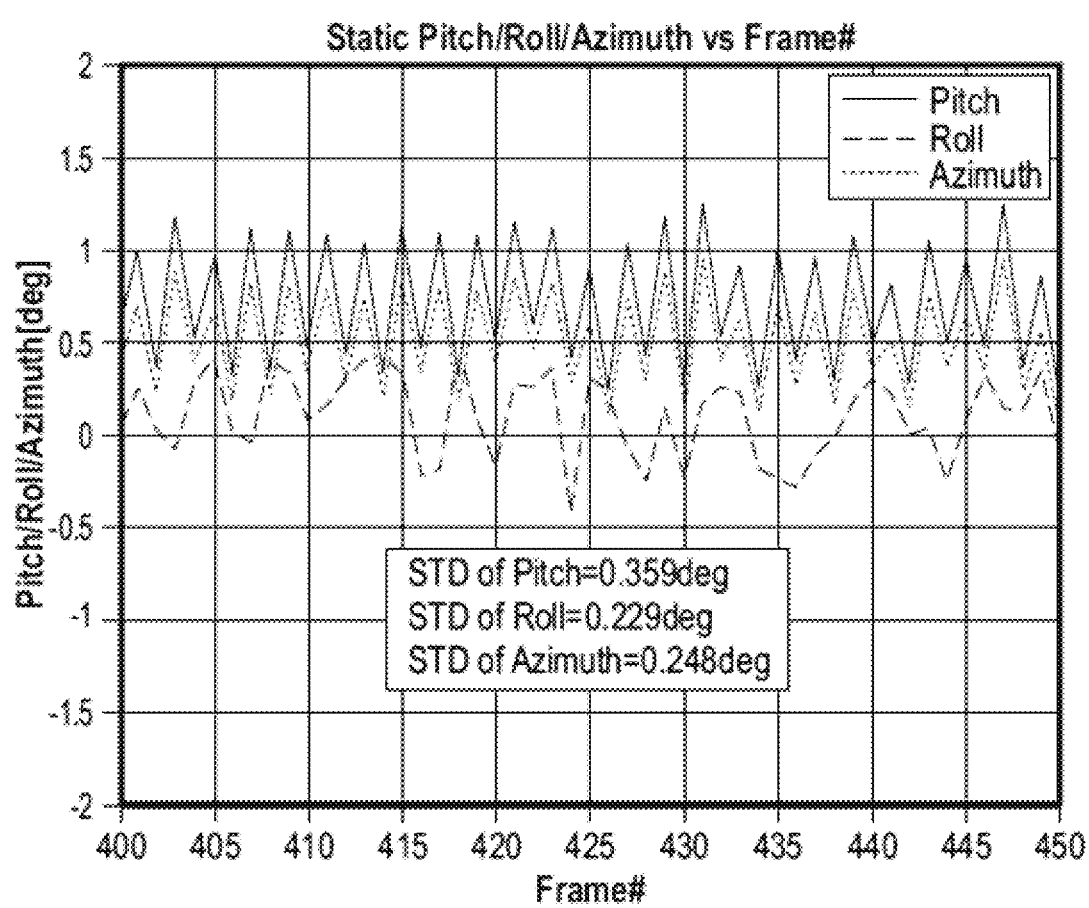
FIG. 11 is a graph of identified roll, pitch, and azimuth angles at varying captured frames, according to some examples of the present disclosure.

FIG. 11 is a graph of identified roll, pitch, and azimuth angles at varying captured frames. The measurements were made at a rate of ten per second. In the graph, a standard deviation of 0.359 degrees was observed for pitch angle. A standard deviation of 0.229 degrees was observed for roll angle. A standard deviation of 0.248 degrees was observed for azimuth angle.

Figure 12A:
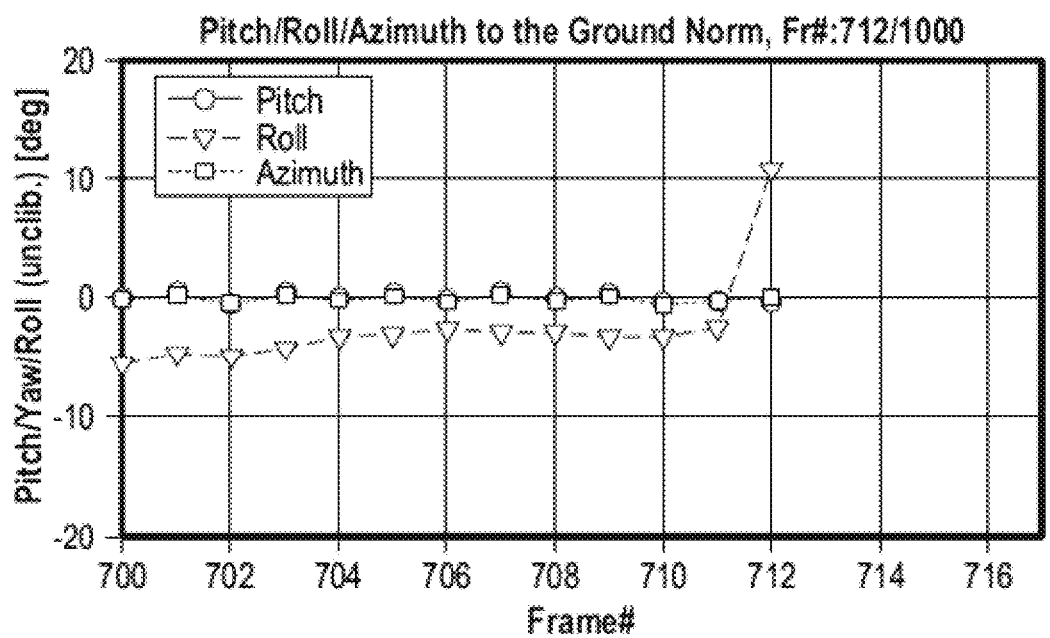
FIG. 12A is a graph of measured roll, pitch, and azimuth angles at varying captured frames, according to some examples of the present disclosure.
Figure 12B:
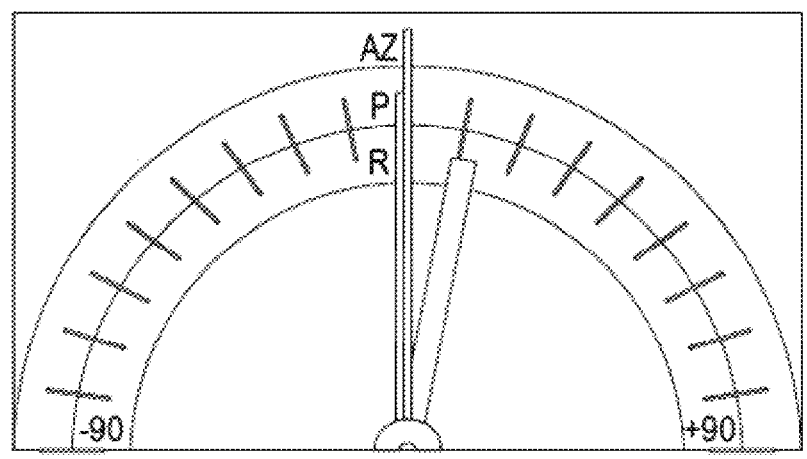
FIG. 12B is a graphical display of the measured, roll, pitch, and azimuth angles, according to some examples of the present disclosure.

FIG. 12A is a graph of measured roll, pitch, and azimuth angles at varying captured frames. FIG. 12B is a graphical display of the measured, roll, pitch, and azimuth angles. As shown in FIG. 12B the graphical display shows the measured roll, pitch, and azimuth angles that are represented in a gauge as different indicator. Each indicator can be updated as the corresponding measured angles change. As shown in FIG. 12A, a roll angle outlier exists. This outlier could be caused by the surface plane estimate jumping to a far distance, thereby causing the roll outlier.

Figure 13:
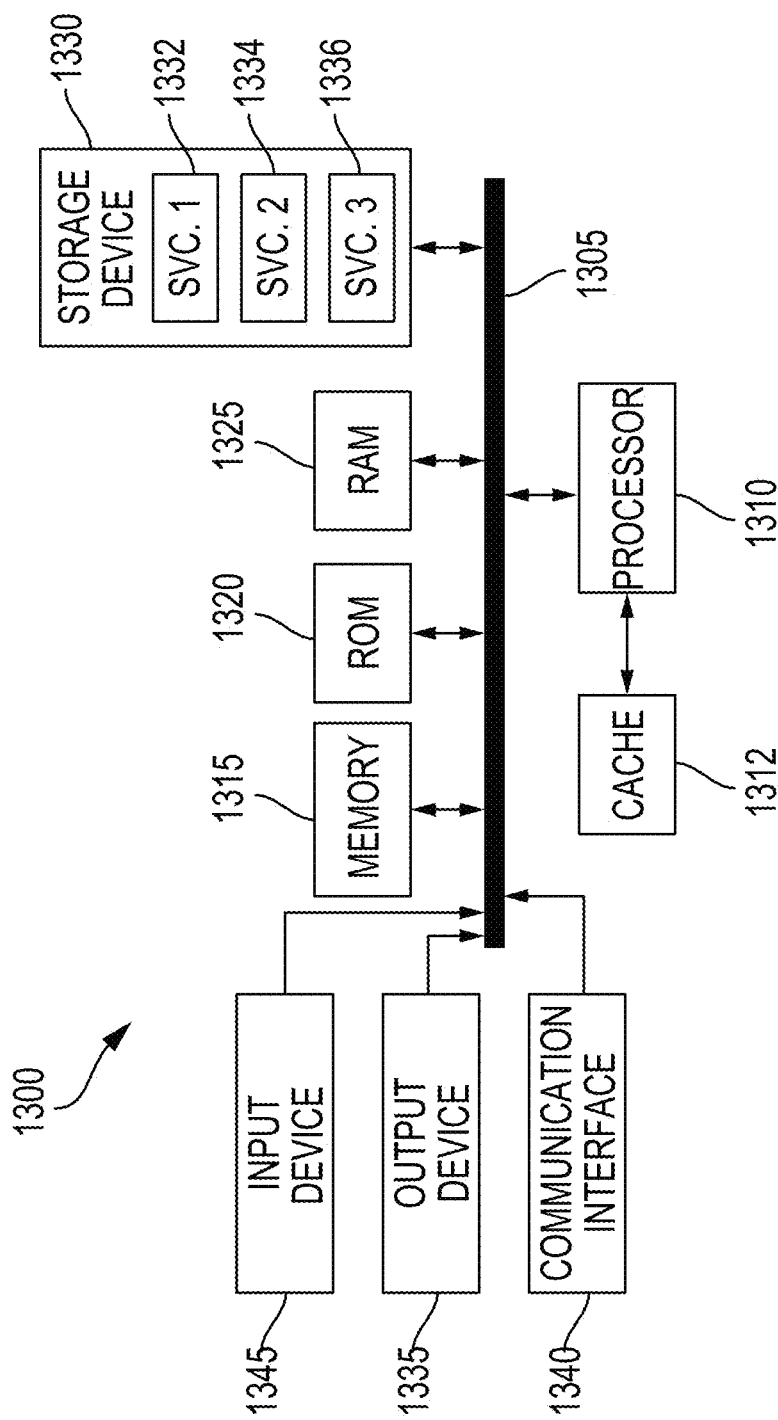
FIG. 13 illustrates an example processor-based system with which some aspects of the subject technology can be implemented, according to some examples of the present disclosure.

FIG. 13 illustrates an example processor-based system with which some aspects of the subject technology can be implemented. For example, processor-based system 1300 can be any computing device making up, or any component thereof in which the components of the system are in communication with each other using connection 1305. Connection 1305 can be a physical connection via a bus, or a direct connection into processor 1310, such as in a chipset architecture. Connection 1305 can also be a virtual connection, networked connection, or logical connection.

In some embodiments, computing system 1300 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1300 includes at least one processing unit (Central Processing Unit (CPU) or processor) 1310 and connection 1305 that couples various system components including system memory 1315, such as Read-Only Memory (ROM) 1320 and Random-Access Memory (RAM) 1325 to processor 1310. Computing system 1300 can include a cache of high-speed memory 1312 connected directly with, in close proximity to, or integrated as part of processor 1310.

Processor 1310 can include any general-purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, speech, etc. Computing system 1300 can also include output device 1335, which can be one or more of a number of output mechanisms known to those of skill in the art. In some instances, multimodal systems can enable a user to provide multiple types of input/output to communicate with computing system 1300. Computing system 1300 can include communications interface 1340, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 1340 may also include one or more Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Static RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 1330 can include software services, servers, services, etc., that when the code that defines such software is executed by the processor 1310, it causes the system 1300 to perform a function. In some embodiments, a hardware service that performs a particular function can include the software component stored in a computer-readable medium in connection with the necessary hardware components, such as processor 1310, connection 1305, output device 1335, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A method comprising: accessing image data tracking a surface as an object moves relative to the surface, wherein the image data is gathered by one or more sensors coupled to the object and is part of a field of view of the one or more sensors aiming at the surface; grouping samples of the image data into different subsets to form a plurality of subsets of the image data; identifying a normal vector to a corresponding plane defined by each subset of the plurality of subsets of the image data; re-grouping the samples of the image data into a single subset of the image data based on the corresponding normal vector for each subset of the plurality of subsets of the image data; and identifying a surface plane representation of the surface based on the single subset of the image data.

Aspect 2. The method of Aspect 1, wherein the samples are re-grouped based on a comparison of the corresponding normal vector for each subset of the plurality of subsets to one or more threshold values associated with corresponding normal vectors of the plurality of subsets of the image data.

Aspect 3. The method of Aspects 1 and 2, further comprising: identifying one or more subsets of the plurality of subsets that have the corresponding normal vectors that fail to meet criteria specified by the one or more threshold values; excluding the one or more subsets from the single subset of the image data; and identifying the surface plane representation of the surface based on the single subset of the image data while omitting the one or more subsets in identifying the surface plane representation.

Aspect 4. The method of Aspects 1 through 3, wherein the one or more threshold values associated with the corresponding normal vectors of the plurality of subsets of the image data includes one or more spatial characteristics of a reference normal vector.

Aspect 5. The method of Aspects 1 through 4, wherein a total number of samples in the single subset of a frame of the image data is less than a total number of samples in the frame of the image data.

Aspect 6. The method of Aspects 1 through 5, wherein the object is an autonomous vehicle and the surface is ground traversed by the autonomous vehicle.

Aspect 7. The method of Aspects 1 through 6, further comprising identifying a ground normal of the ground from the surface plane representation that is identified based on the single subset of the image data.

Aspect 8. The method of Aspects 1 through 7, further comprising identifying one or a combination of roll, pitch, and azimuth of the autonomous vehicle with respect to the ground based on the ground normal.

Aspect 9. The method of Aspects 1 through 8, wherein the image data includes 7D information comprising 3D spatial data, 2D orientation data, and 2D image data, the method further comprising refining the single subset of the image data based on the 7D information included in the single subset of the image data.

Aspect 10. A system comprising: one or more processors; and at least one computer-readable storage medium having stored therein instructions which, when executed by the one or more processors, cause the one or more processors to: access image data tracking a surface as an object moves relative to the surface, wherein the image data is gathered by one or more sensors coupled to the object and is part of a field of view of the one or more sensors aiming at the surface; group samples of the image data into different subsets to form a plurality of subsets of the image data; identify a normal vector to a corresponding plane defined by each subset of the plurality of subsets of the image data; re-group the samples of the image data into a single subset of the image data based on the corresponding normal vector for each subset of the plurality of subsets of the image data; and identify a surface plane representation of the surface based on the single subset of the image data.

Aspect 11. The system of Aspect 10, wherein the samples are re-grouped based on a comparison of the corresponding normal vector for each subset of the plurality of subsets to one or more threshold values associated with corresponding normal vectors of the plurality of subsets of the image data.

Aspect 12. The system of Aspects 10 and 11, wherein the instructions further cause the one or more processors to: identify one or more subsets of the plurality of subsets that have the corresponding normal vectors that fail to meet criteria specified by the one or more threshold values; exclude the one or more subsets from the single subset of the image data; and identify the surface plane representation of the surface based on the single subset of the image data while omitting the one or more subsets in identifying the surface plane representation.

Aspect 13. The system of Aspects 10 through 12, wherein the one or more threshold values associated with the corresponding normal vectors of the plurality of subsets of the image data includes one or more spatial characteristics of a reference normal vector.

Aspect 14. The system of Aspects 10 through 13, wherein a total number of samples in the single subset of a frame of the image data is less than a total number of samples in the frame of the image data.

Aspect 15. The system of Aspects 10 through 14, wherein the object is an autonomous vehicle and the surface is ground traversed by the autonomous vehicle.

Aspect 16. The system of Aspects 10 through 15, wherein the instructions further cause the one or more processors to identify a ground normal of the ground from the surface plane representation that is identified based on the single subset of the image data.

Aspect 17. The system of Aspects 10 through 16, wherein the instructions further cause the one or more processors to identify one or a combination of roll, pitch, and azimuth of the autonomous vehicle with respect to the ground based on the ground normal.

Aspect 18. The system of Aspects 10 through 17, wherein the image data includes 7D information comprising 3D spatial data, 2D orientation data, and 2D image data, and the instructions further cause the one or more processors to refine the single subset of the image data based on the 7D information included in the single subset of the image data.

Aspect 19. A non-transitory computer-readable storage medium having stored therein instructions which, when executed by one or more processors, cause the one or more processors to: access image data tracking a surface as an object moves relative to the surface, wherein the image data is gathered by one or more sensors coupled to the object and is part of a field of view of the one or more sensors aiming at the surface; group samples of the image data into different subsets to form a plurality of subsets of the image data; identify a normal vector to a corresponding plane defined by each subset of the plurality of subsets of the image data; re-group the samples of the image data into a single subset of the image data based on the corresponding normal vector for each subset of the plurality of subsets of the image data; and identify a surface plane representation of the surface based on the single subset of the image data.

Aspect 20. The non-transitory computer-readable storage medium of Aspect 19, wherein the samples are re-grouped based on a comparison of the corresponding normal vector for each subset of the plurality of subsets to one or more threshold values associated with corresponding normal vectors of the plurality of subsets of the image data and the instructions further cause the one or more processors to: identify one or more subsets of the plurality of subsets that have the corresponding normal vectors that fail to meet criteria specified by the one or more threshold values; exclude the one or more subsets from the single subset of the image data; and identify the surface plane representation of the surface based on the single subset of the image data while omitting the one or more subsets in identifying the surface plane representation.

Aspect 21. A system comprising means for performing a method according to any of Aspects 1 through 9.

What is claimed is:
1. A method comprising:
  accessing image data tracking a surface as an object moves relative to the surface, wherein the image data is gathered by one or more sensors coupled to the object and is part of a field of view of the one or more sensors aiming at the surface, wherein the object is an autonomous vehicle and the surface is ground traversed by the autonomous vehicle, and wherein the image data includes 7D information comprising 3D spatial data, 2D orientation data, and 2D image data;

grouping samples of the image data into different subsets to form a plurality of subsets of the image data;
identifying a normal vector to a corresponding plane defined by each subset of the plurality of subsets of the image data;
re-grouping the samples of the image data into a single subset of the image data based on the corresponding normal vector for each subset of the plurality of subsets of the image data
refining the single subset of the image data based on the 7D information included in the single subset of the image data; and
identifying a surface plane representation of the surface based on the single subset of the image data.

2. The method of claim 1, wherein the samples are re-grouped based on a comparison of the corresponding normal vector for each subset of the plurality of subsets to one or more threshold values associated with corresponding normal vectors of the plurality of subsets of the image data.

3. The method of claim 2, further comprising:
identifying one or more subsets of the plurality of subsets that have the corresponding normal vectors that fail to meet criteria specified by the one or more threshold values;
excluding the one or more subsets from the single subset of the image data; and
identifying the surface plane representation of the surface based on the single subset of the image data while omitting the one or more subsets in identifying the surface plane representation.

4. The method of claim 2, wherein the one or more threshold values associated with the corresponding normal vectors of the plurality of subsets of the image data includes one or more spatial characteristics of a reference normal vector.

5. The method of claim 1, wherein a total number of samples in the single subset of a frame of the image data is less than a total number of samples in the frame of the image data.

6. The method of claim 1, further comprising identifying a ground normal of the ground from the surface plane representation that is identified based on the single subset of the image data.

7. The method of claim 6, further comprising identifying one or a combination of roll, pitch, and azimuth of the autonomous vehicle with respect to the ground based on the ground normal.

8. A system comprising:
one or more processors; and
at least one non-transitory computer-readable storage medium having stored therein instructions which, when executed by the one or more processors, cause the one or more processors to:
access image data tracking a surface as an object moves relative to the surface, wherein the image data is gathered by one or more sensors coupled to the object and is part of a field of view of the one or more sensors aiming at the surface, wherein the object is an autonomous vehicle and the surface is ground traversed by the autonomous vehicle, and wherein the image data includes 7D information comprising 3D spatial data, 2D orientation data, and 2D image data;
group samples of the image data into different subsets to form a plurality of subsets of the image data;
identify a normal vector to a corresponding plane defined by each subset of the plurality of subsets of the image data;
re-group the samples of the image data into a single subset of the image data based on the corresponding normal vector for each subset of the plurality of subsets of the image data
refine the single subset of the image data based on the 7D information included in the single subset of the image data; and
identify a surface plane representation of the surface based on the single subset of the image data.

9. The system of claim 8, wherein the samples are re-grouped based on a comparison of the corresponding normal vector for each subset of the plurality of subsets to one or more threshold values associated with corresponding normal vectors of the plurality of subsets of the image data.

10. The system of claim 9, wherein the instructions further cause the one or more processors to:
identify one or more subsets of the plurality of subsets that have the corresponding normal vectors that fail to meet criteria specified by the one or more threshold values;
exclude the one or more subsets from the single subset of the image data; and
identify the surface plane representation of the surface based on the single subset of the image data while omitting the one or more subsets in identifying the surface plane representation.

11. The system of claim 9, wherein the one or more threshold values associated with the corresponding normal vectors of the plurality of subsets of the image data includes one or more spatial characteristics of a reference normal vector.

12. The system of claim 8, wherein a total number of samples in the single subset of a frame of the image data is less than a total number of samples in the frame of the image data.

13. The system of claim 8, wherein the instructions further cause the one or more processors to identify a ground normal of the ground from the surface plane representation that is identified based on the single subset of the image data.

14. The system of claim 13, wherein the instructions further cause the one or more processors to identify one or a combination of roll, pitch, and azimuth of the autonomous vehicle with respect to the ground based on the ground normal.

15. The system of claim 8, wherein the image data includes 7D information comprising 3D spatial data, 2D orientation data, and 2D image data, and the instructions further cause the one or more processors to refine the single subset of the image data based on the 7D information included in the single subset of the image data.

16. A non-transitory computer-readable storage medium having stored therein instructions which, when executed by one or more processors, cause the one or more processors to:
access image data tracking a surface as an object moves relative to the surface, wherein the image data is gathered by one or more sensors coupled to the object and is part of a field of view of the one or more sensors aiming at the surface, wherein the object is an autonomous vehicle and the surface is ground traversed by the autonomous vehicle, and wherein the image data includes 7D information comprising 3D spatial data, 2D orientation data, and 2D image data;
group samples of the image data into different subsets to form a plurality of subsets of the image data;
identify a normal vector to a corresponding plane defined by each subset of the plurality of subsets of the image data;

re-group the samples of the image data into a single subset of the image data based on the corresponding normal vector for each subset of the plurality of subsets of the image data refine the single subset of the image data based on the 7D information included in the single subset of the image data; and identifying a surface plane representation of the surface based on the single subset of the image data.

17. The non-transitory computer-readable storage medium of claim 16, wherein the samples are re-grouped based on a comparison of the corresponding normal vector for each subset of the plurality of subsets to one or more threshold values associated with corresponding normal vectors of the plurality of subsets of the image data and the instructions further cause the one or more processors to:

identify one or more subsets of the plurality of subsets that have the corresponding normal vectors that fail to meet criteria specified by the one or more threshold values;

exclude the one or more subsets from the single subset of the image data; and identify the surface plane representation of the surface based on the single subset of the image data while omitting the one or more subsets in identifying the surface plane representation.

\* \* \* \* \*